United States Patent [19]

De Vaan et al.

[11] Patent Number: 5,721,603
[45] Date of Patent: Feb. 24, 1998

[54] ILLUMINATION SYSTEM AND DISPLAY DEVICE INCLUDING SUCH A SYSTEM

[75] Inventors: Adrianus J.S.M. De Vaan; Paulus B.J. Schaareman, both of Eindhoven, Netherlands

[73] Assignee: U.S. Philips Corporation, New York, N.Y.

[21] Appl. No.: 768,039

[22] Filed: Dec. 17, 1996

Related U.S. Application Data

[63] Continuation of Ser. No. 589,179, Jan. 19, 1996, abandoned, which is a continuation of Ser. No. 179,809, Jan. 11, 1994, abandoned.

[30] Foreign Application Priority Data

Jan. 11, 1993 [EP] European Pat. Off. ............. 93200056

[51] Int. Cl.$^6$ .............................. G02F 1/13; G02F 1/1335; C09K 18/02
[52] U.S. Cl. .............................. 349/194; 349/98; 349/175
[58] Field of Search .............................. 359/65, 69, 68, 359/73, 49, 105; 349/98, 175, 185, 194, 112

[56] References Cited

U.S. PATENT DOCUMENTS

| 4,088,400 | 5/1978 | Assouline | 359/69 |
|---|---|---|---|
| 4,298,249 | 11/1981 | Gloor | 359/69 |
| 4,737,896 | 4/1988 | Mochizuki et al. | 362/301 |
| 5,029,986 | 7/1991 | De Vaan | 350/338 |
| 5,159,478 | 10/1992 | Akiyama | 359/69 |
| 5,262,880 | 11/1993 | Abeleah | 359/69 |
| 5,325,218 | 6/1994 | Willett | 359/65 |
| 5,341,231 | 8/1994 | Yamamoto et al. | 359/69 |
| 5,513,025 | 4/1996 | Watanabe et al. | 359/69 |

FOREIGN PATENT DOCUMENTS

| 0266184 | 5/1988 | European Pat. Off. | |
| 5202425 | 12/1985 | Japan | 359/69 |
| 2257188 | 10/1990 | Japan | |
| 5196808 | 8/1993 | Japan | 359/69 |
| 9110051 | 4/1994 | Japan | 359/69 |

OTHER PUBLICATIONS

"Polarizing Color Filters made from Cholesteric LC Silicones" by R. Maurer et al. in SID International Symposium 1990, Digest of Technical Papers, pp. 110–113 (No Month).
"New Liquid Polarized Color Projection Principle" in Japanese Journal of Applied Physics, vol. 29, No. 10, Oct. 1990, pp. 1974–1984 by M. Schadt and J. Funfschilling.
"Retardation Film for STN–LCD's 'NRF'" by the firm of Nitto Denko in SID '92 Exhibit Guide, Society for Information Display, May 17–22, 1992, Boston, MA.

Primary Examiner—William L. Sikes
Assistant Examiner—Teep H. Nguyen
Attorney, Agent, or Firm—John C. Fox

[57] ABSTRACT

An illumination system comprising a reflector, a cholesteric filter and a depolarizer. The cholesteric filter is arranged between a radiation source and, in a display device, a display panel, and is selected to transmit radiation having a selected state of polarization in a selected wavelength range, while reflecting otherwise polarized radiation in that wavelength range. The depolarizer is disposed between the reflector and the cholesteric filter. Radiation reflected by the cholesteric filter is re-reflected to the filter by the reflector and, having been depolarized in the depolarizer, is transmitted to the extent it has the selected state of polarization in the selected wavelength.

20 Claims, 6 Drawing Sheets

ILLUMINATION SYSTEM AND DISPLAY DEVICE INCLUDING SUCH A SYSTEM

This is a file wrapper continuation of continuation application Ser. No. 08/589,179, filed Jan. 19, 1996, now abandoned, which is a continuation of application Ser. No. 08/179,809, filed Jan. 11, 1994, now abandoned.

BACKGROUND OF THE INVENTION

The invention relates to an illumination system for supplying an illumination beam having a selected state of polarization, which system successively comprises a radiation source and a diffuser. The invention also relates to a display device including such an illumination system.

The display devices under consideration may be grouped in two types, viz. image projection devices and flat-panel display devices. An image projection device is a device in which an image generated by means of a display panel, for example a liquid crystalline panel is imaged at a relatively large distance and in a magnified form on a projection screen by means of a projection lens system. In a flat-panel display device an image is also generated by a display panel. The dimension of this device in the direction transverse to the display panel is relatively small, much smaller than the dimension of an image projection device. In a flat-panel display device a viewer directly watches the display panel so that this device may also be referred to as a direct-vision device. For such a device it is desirable that the illumination system for illuminating the display panel has a small dimension in the direction transverse to the panel.

The display device may be, for example a video display device or a monitor of a computer system, or the display device of an instrument panel.

An illumination system of the type described in the opening paragraph, suitable for use in a flat-panel display device, is known from U.S. Pat. No. US-A 4,737,896.

The illumination system described in this Patent is arranged directly behind a transmission display panel and comprises a radiation source whose radiation is incident on a radiation-guiding member having a radiation-scattering exit plane which scatters the radiation towards a liquid crystalline display panel, hereinafter referred to as LCD panel.

In a display device with a liquid LCD panel the luminous efficiency, i.e. the percentage of the radiation supplied by the radiation source and being visible to a viewer at the display side is relatively small due to the low transmission of the LCD panel. The reason is that the translucent pixels jointly cover only a part of the surface of the display panel. The other part of this surface is occupied by the drive elements for the pixels. The LCD panel operates on the basis of a change by each individual pixel of the state of polarization of the light incident on the liquid crystalline material of the element. Therefore, the display panel should be irradiated with radiation having a given state of polarization, such as linearly polarized light having a given direction of polarization, or levorotatory or dextrorotatory circularly polarized light. The known display devices are therefore provided with polarization means which convert the unpolarized light from the source into light having the desired state of polarization. This conversion is accompanied by the loss of approximately half the quantity of light.

The polarization means used in the conventional direct-vision display devices absorb the light having the unwanted state of polarization. In order that a sufficient quantity of light is available to the viewer, a high-intensity radiation source should be used in this device. Such a radiation source has relatively large dimensions and uses much energy so that it is less suitable for a compact display device which can preferably be used separately from a mains supply. Since the light incident on the polarization means has a high intensity, the polarization means are heated to a considerable extent. Since these polarizers are proximate to the LCD panel in the devices under consideration, it may be necessary to incorporate a cooling system, which renders the display device more complicated and more expensive.

OBJECTS AND SUMMARY OF THE INVENTION

It is an object of the invention to provide an efficient illumination system in which a maximum quantity of radiation from the source is converted into radiation having the desired direction of polarization.

To this end the display device according to the invention is characterized in that the diffuser is a depolarizing diffuser, in that a cholesteric filter which is active in at least substantially the full visible wavelength range is arranged at a diffuser side remote from the radiation source, and in that a reflector is arranged at a diffuser side remote from the filter.

Depolarizing is herein understood to mean the at least partial conversion of radiation having a given state of polarization into unpolarized radiation, i.e. radiation comprising different polarization components.

Cholesteric filters have an optical layer of a liquid crystalline polymer material having a cholesteric ordering. This means that the molecules of the material in solution are spontaneously ordered to form a helical structure having a pitch p. After such a solution has been provided as a thin, optically active layer between two parallel substrates, the helical structure is directed in such a way that the axis of the helix will be transverse to the layer. The alignment of the helix can be improved by providing an orientation layer on the facing surfaces of the substrates.

When an unpolarized radiation beam is incident on such a filter, a circularly polarized radiation component having a direction of rotation (levorotatory or dextrorotatory) corresponding to the direction of the molecular helix and having a wavelength corresponding to the pitch p of the helix will be reflected, while a circularly polarized component having the opposite direction of rotation and a wavelength not adapted to the filter will be transmitted. The reflection wavelength $\lambda_0$ of the cholesteric filter is defined by $$\lambda_0 = \tfrac{1}{2}(n_o + n_e)p$$

in which $n_o$ and $n_e$ are the respective ordinary and extraordinary refractive indices of the material of the filter and p is the pitch of the molecular helix.

The light having the unwanted direction of polarization is thus no longer absorbed but reflected by the cholesteric filter. This light is subsequently transmitted to the cholesteric filter by the reflector and is depolarized by the diffuser so that a part thereof has the desired direction of polarization again and is as yet transmitted to the display panel by the filter. The remaining part is reflected by the filter and subsequently on the reflector so that, due to the use of the diffuser, a part of the light is incident on the cholesteric filter in the correct state of polarization and is transmitted to the LCD panel. Thus, for example 80% of the light of the wavelength band for which the cholesteric filter is active can be brought to the desired state of polarization. Moreover, since the cholesteric filter is active throughout the visible wavelength range, the component having the unwanted state of polarization is reflected towards the reflector by the filter for all radiation in this wavelength range and is again transmitted to the filter so that said 80% efficiency applies to the full visible wavelength range. The light transmitted by the cholesteric filter is suitable for illuminating both a monochrome and a color display panel.

By combining a cholesteric filter and a depolarizing diffuser with a radiation source and a reflector, a unique illumination system is obtained which supplies white light having the desired state of polarization and whose luminous efficiency is largely determined by the radiation source. When an efficient lamp is used as a radiation source, a desired light power can be obtained at a relatively low consumption of electric power. Although the illumination system is primarily intended for a directvision display device, it may also be used advantageously in an image projection device and in optical devices in which light having a given state of polarization must be used.

It is to be noted that it is known per se to use a cholesteric filter as a polarizer. Cholesteric filters are known, for example from the article "Polarizing Color Filters made from Cholesteric LC Silicones" by R. Maurer et al. in SID International Symposium 1990, Digest of Technical Papers, pp. 110–113. The cholesteric filters described in this article have an optically active layer comprising a polymer material with a cholesteric ordering on the basis of silicones. Said article by Maurer does not propose to combine the cholesteric filter with a depolarizing diffuser and a reflector in order to enhance the polarization conversion efficiency.

It is further to be noted that it is known per se from the article "New Liquid Crystal Polarized Color Projection Principle" in Japanese Journal of Applied Physics, vol. 29, no. 10, October 1990, pp. 1974–1984 by M. Schadt and I. F Ünfschilling to combine a cholesteric filter in an illumination system for LCD panels with a specular reflector which inverts the state of polarization of a beam reflected by the filter, and subsequently transmits this beam to the filter again. In this way also the light having the state of polarization originally not suitable for the filter is transmitted to the LCD panel. A drawback of such a specular reflector is, however, that it concentrates the radiation reflected by the cholesteric filter on the radiation source in the form of a lamp. Since this lamp has an absorbing effect on its own radiation, the lamp shape will remain visible in the ultimate image formed by the display device, which is troublesome to the viewer.

Moreover, if the selectivity of the cholesteric filter for levorotatory and dextrorotatory circularly polarized radiation is sufficiently high, it is possible to dispense with the polarizer which is arranged in front of the LCD panel and forms part of a conventional LCD panel and, together with an analyzer arranged behind the LCD panel, ensures a sufficient contrast of the formed image.

In the current display devices LCD panels are preferably used which, dependent on the energization of a given pixel, convert linearly polarized radiation having a given direction of polarization into linearly polarized radiation having a second direction of polarization perpendicular to the first direction of polarization. An illumination system which is very suitable for such a display device is characterized in that a wideband $\lambda/4$ plate is arranged at a side of the cholesteric filter remote from the diffuser.

This plate converts the circularly polarized radiation exiting from the filter into linearly polarized radiation having a direction of polarization suitable for the LCD panel. A wideband $\lambda/4$ plate is a transparent element which is composed of, for example a plurality of layers and realises such a phase shift in a beam at all wavelengths ($\lambda$) in the visible wavelength range that circularly polarized radiation is converted into linearly polarized radiation. Such a $\lambda/4$ plate is described in, for example the publication "Retardation Film for STN-LCD's 'NRF'" by the firm of Nitto Denko in SID '92 Exhibit Guide, Society for Information Display, May 17–22, 1992, Boston, Mass., USA.

A first embodiment of the illumination system according to the invention is characterized in that the cholesteric filter is composed of a plurality of layers of liquid crystalline material, each layer being active for a different wavelength band, which wavelength bands jointly cover at least the visible wavelength range.

A preferred embodiment of the illumination system according to the invention is characterized in that the cholesteric filter has a single layer of liquid crystalline polymer material, within which layer the pitch of the molecular helix varies between two values which correspond to the lower limit and the upper limit, respectively, of the reflection band necessary to cover at least the full visible wavelength range.

This embodiment is based on the newly gained insight that the pitch of the molecular helix of a liquid crystalline polymer material with a cholesteric ordering can be continuously varied and utilizes the fact that the Applicant has succeeded in realising a single-layer cholesteric filter with a sufficiently large variation of the pitch within this layer, so that it is no longer necessary to stack a plurality of layers each formed by a liquid crystalline material having a different wavelength reflection band. In the cholesteric filter with a continuously varying pitch according to the invention the polymer layer is divided into imaginary sub-layers each having their own pitch and each consequently reflecting, in their own wavelength band, radiation in the state of polarization which is unwanted for the LCD panel. All sub-layers combined realise the desired reflection in the desired wavelength range so that a single layer is sufficient to cover the full visible wavelength range (between 400 and 780 nm). By continuous variation of the pitch within a single layer it is sufficient to use a layer thickness which is smaller than the total thickness required when stacking the pack of discrete layers so as to realise the desired reflection in the same wavelength band.

The advantage thereof is a better optical quality of the filter. In fact, the quality of such filters decreases relatively fast with an increasing number of layers due to errors which are typical of cholesterics and due to loss of molecular ordering. Since a cholesteric layer with a reflection band of 50 nm has a polarizing effect, the layer should have a minimum thickness of 5 μm. To cover the complete visible wavelength range, a minimum number of seven to eight layers is thus required if the increase of the required reflection bandwidth due to the viewing angle dependence is not taken into account. This yields a minimum layer thickness of 35 μm. In a single-layer cholesteric filter, within which the pitch continuously varies across the layer thickness, a layer thickness of 20 μm is sufficient to act as a polarizer. Moreover, the viewing angle dependence of the filter increases with an increasing thickness. This means that the effectiveness of the filter decreases considerably with larger layer thicknesses for radiation incident at an angle which is larger than a given angle of incidence.

The relevant inventive idea may also be used if cholesteric materials are used which are not suitable for realising a sufficiently large variation of the pitch of the helix in one single layer.

An embodiment of the illumination system according to the invention, in which this is the case, is characterized in that at least a plurality of layers of the cholesteric filter comprises a liquid crystalline polymer in which the pitch of the molecular helix varies continuously, each layer being active in a different wavelength band.

By varying the pitch in a plurality of layers or in each layer of the filter, the wavelength range of the relevant layer is increased. Consequently, the number of layers required to cover the full visible wavelength range may be limited considerably so that the previously mentioned advantages of a smaller number of filter layers also apply in this case.

A further embodiment of the illumination system according to the invention is characterized in that the polymer material of the cholesteric filter forms a three-dimensional network and a self-supporting film which is suitable to be secured to other elements of the system.

Optically active layers which form a three-dimensional network are very robust and may consequently be used as self-supporting layers.

Substrates which are required during manufacture for alignment and polymerization of the optically active layer of the cholesteric filter can then be removed after these process steps have been performed, which contributes to the compactness of the illumination system.

Since the effectiveness of a cholesteric filter is not only dependent on the wavelength of the incident radiation but also on the angle of incidence at which this radiation is incident on the filter, the diffuser present in the illumination system and ensuring a depolarization of radiation having an unwanted state of polarization and notably ensuring in a direct-vision display device that the entire display panel is illuminated may have the drawback, as far as the cholesteric filter is concerned, that radiation is scattered towards the cholesteric filter also at large angles. When the angle of incidence is varied, the wavelength band for which the filter reflects polarization-selectively is shifted. This means that the wavelength band for which the filter should be reflecting is equal to the sum of the actual wavelength band of the visible wavelength range, for example between 400 nm and 780 nm, and a fictitious wavelength band so as to be polarization-selective also for radiation which is incident at an angle of incidence differing from 90°. The shift of the wavelength band as a function of a change of the angle of incidence is, for example 2 nm per degree so that for the extreme case of 180° for the range of angles of incidence the fictitious wavelength band is 360 nm. The total reflection band would then have to be 380 nm+360 nm=740 nm.

In accordance with a further aspect of the invention the requirements imposed on the cholesteric filter can be alleviated and the illumination system can be made better suitable for illuminating, for example an LCD panel if the illumination system is further characterized in that an optically transparent element is arranged between the diffuser and the cholesteric filter, one side of said element facing the filter having a periodical and radiation-refracting structure extending in at least one direction for concentrating radiation from the diffuser at a given angle.

Since the beam-concentrating element reduces the area of the angles of incidence at which the radiation is incident on the cholesteric filter, the required fictitious wavelength band and hence the required reflection band of the filter are reduced. Consequently, a single-layer filter will not require such a large variation of the helix pitch and a multilayer filter will require fewer layers.

Dependent on the structure of the display device, the periodical structure may be a one-dimensional or a two-dimensional structure.

In a display device with an LCD panel it is desirable that the panel is irradiated as much as possible at a given angle so as to obtain a maximum contrast. By adapting the beam-concentrating element, the average angle at which the radiation leaves the element can be adapted, which contributes to the realisation of this wish.

The periodical structure of the beam-concentrating element may be realised in different manners.

A first possibility is used in an embodiment of the illumination system which is characterized in that the element is composed of a first plate of which a surface facing the filter has a first periodical structure which extends in a first direction in the plane of the plate, and a second plate of which a surface facing the filter has a second periodical structure which extends in a second direction in the plane of the plate and at an angle to the first direction.

An alternative embodiment of the illumination system according to the invention is characterized in that the element is a single plate of which a surface facing the filter has a two-dimensional radiation-refracting structure.

The elements of the periodical structure may be further implemented in various manners. For example, the illumination system according to the invention may be characterized in that the radiation-refracting structure is constituted by first surface areas which alternate with second surface areas, the first areas enclosing a first angle and the second areas enclosing a second angle with the normal on the element.

The elements of the periodical structure may be, for example small lenses or prisms which operate with total internal reflection and can be optimized by a suitable choice of the prism angles and/or the refractive index of the prism material.

It is to be noted that the use of a plate with prisms in an illumination system for concentrating the radiation at a given spatial angle is known per se, inter alia from the English-language Abstract of JP-A 2-257188. However, this publication does not disclose the combination with a cholesteric filter and the advantages of the prism plate in such a combination.

The invention also relates to an image projection device comprising an illumination system and a display device having at least one transmission display panel for generating an image to be projected, and a projection lens system for projecting the generated image on a projection screen. Such a device according to the invention is characterized in that the illumination system is a system as described hereinbefore.

The invention further particularly relates to a flat-panel display device comprising an illumination system and a transmission display panel, which device according to the invention is characterized in that the illumination system is a system as described hereinbefore.

The luminous efficiency of such a device provided with a color display panel may be further enhanced if this device is further characterized in that a pattern of dichroic mirrors registering with the pixels of the display panel is arranged in front of and proximate to said pixels, each mirror transmitting radiation in a wavelength band associated with the corresponding pixel and substantially completely reflecting radiation outside said wavelength band.

U.S. Pat. No. US-A 5,029,986 describes a color display panel having a built-in matrix of dichroic mirrors, and also describes how the luminous efficiency can be enhanced by combining such a mirror matrix with a reflector. A very efficient color display device is obtained by combining such a panel with an illumination system of the type described above.

BRIEF DESCRIPTION OF THE DRAWING

These and other aspects of the invention will be apparent from and elucidated with reference to the embodiments described hereinafter.

In the drawings

DESCRIPTION OF THE PREFERRED EMBODIMENTS

Figure 1:
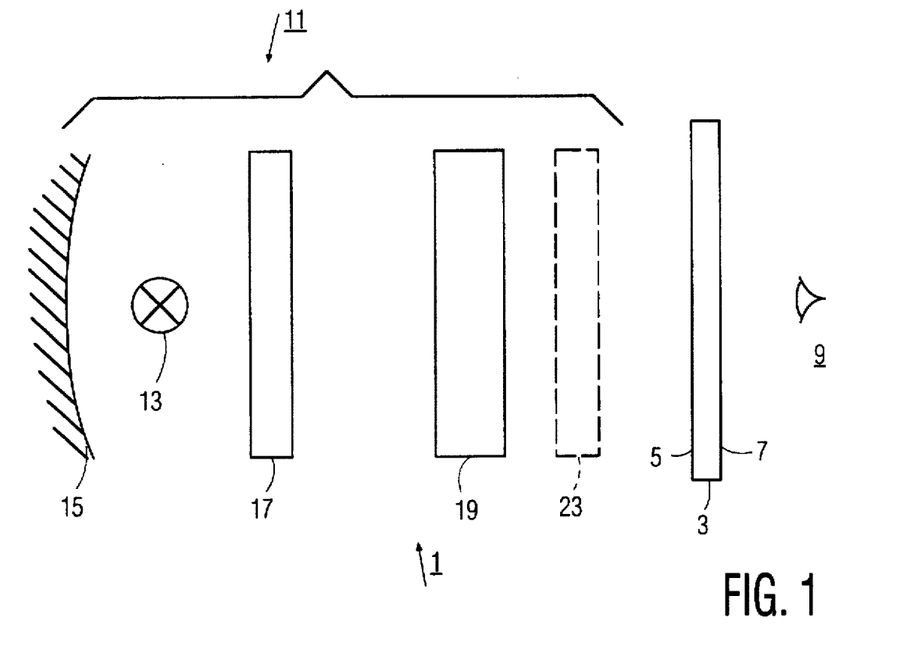
FIG. 1 shows diagrammatically an embodiment of a flat-panel display device according to the invention, including a cholesteric filter.

The direct-vision display device 1 diagrammatically shown in FIG. 1 comprises a transmission display panel 3 having an illumination side 5 and a display side 7 directed towards a viewer 9. The display device 1 further comprises an illumination system 11 according to the invention. The illumination system 11 comprises a radiation source 13 and a reflector 15 arranged behind it. A diffuser 17 for scattering the radiation from the radiation source 13 to the display panel 3 is arranged between the radiation source 13 and the display panel 3 for a uniform illumination of the panel.

The display panel may be, for example a liquid crystal display panel (LCD, Liquid Crystal Display) which is formed by two glass substrates between which an oriented liquid crystal layer is provided. Such panels, whose operation is based on changing or not changing the state of polarization of the light passing through, must be irradiated with light having a given state of polarization. Since the radiation emitted by the radiation source 13 is unpolarized, it should first be converted into a state of polarization which is suitable for the panel.

The conversion of the state of polarization in the illumination system 11 according to the present invention is realised very efficiently by means of a novel cholesteric filter 19 which is active in the full visible wavelength range. This filter is designed in such a way that its transmission polarization for this wavelength range corresponds to the polarization suitable for the display panel 3. The cholesteric filter 19 is arranged between the diffuser 17 and the display panel 3. The unpolarized radiation from the radiation source 13 is incident on the cholesteric filter 19 via the diffuser 17.

The cholesteric filters used in known display devices are only active within a limited wavelength band, for example 50 nm, which band is much narrower than the visible wavelength range, for example 380 nm. Radiation at a wavelength outside the reflection band of the known filter is transmitted in an unpolarized form, which means that the filter is operative as a polarizer for a limited wavelength range only. For this reason, the known filters are very suitable for use as color filters, but the reflection bandwidth is not large enough for them to be used as polarization filters in the above-mentioned applications in devices such as image projection devices and flat-panel display devices.

The width of the reflection band $\Delta\lambda$ is defined by $\Delta\lambda=\lambda_0\Delta n/\bar{n}$ in which $\Delta n=n_e-n_o$ is the birefringence, in which $n_e$ and $n_o$ are the extraordinary and ordinary refractive indices, respectively, and $\bar{n}=(n_e+n_o)/2$ is the avenge refractive index. $\lambda_0$ is the central wavelength of the selective reflection band at perpendicular incidence of the radiation and is defined by $$\lambda_0 = \bar{n}p = \frac{(n_e+n_o)}{2} p,$$

in which p is the pitch of the molecular helix of the filter. In the visible wavelength range the width of the reflection band is mainly determined by the birefringence $\Delta n$ of the cholesteric material, which birefringence can be varied to a small extent only. Generally, $\Delta n$ will be smaller than 0.3 so that the bandwidth is smaller than 100 nm and generally approximately 50 nm.

To obtain a cholesteric filter which is suitable for a display device, that is, a cholesteric filter which is operative in the full visible wavelength range, a plurality of narrow-band cholesteric layers each having a different reflection band can be stacked. The composite filter then has a total reflection bandwidth which is equal to the sum of the reflection bandwidths of the separate layers and which may be sufficiently large to polarize the right in the full visible wavelength range.

However, according to the present invention a cholesteric filter is used which, in principle, consists of one single layer and whose pitch p of the molecular helix across the layer thickness varies between a lower limit and an upper limit so that the resultant reflection bandwidth corresponds to the bandwidth which is required for the filter to be operative in the full visible wavelength range.

The advantage of this single-layer filter with respect to a stacked filter is that the optical quality of the first-mentioned filter is considerably better because stacking of layers leads to a decreasing optical quality with an increasing number of layers due to the presence of errors in the cholesterics and due to the loss of planar molecular ordering. Moreover, the viewing angle dependence increases with an increasing layer thickness, hence with an increasing number of layers. This means that the effectiveness of the filter decreases considerably with an increasing layer thickness for radiation incident at an angle of incidence which is larger than a given value.

A reflection bandwidth of 780 nm–400 nm=380 nm is required for the full visible wavelength range. The effectiveness of a cholesteric filter is also determined by the angle of incidence at which the radiation to be polarized is incident. The reflection band of the filter shifts as a function of the angle of incidence, for example by 2 nm per degree. This means that, due to varying angles of incidence, the reflection band required for the visible wavelength range is to be supplemented with a fictitious wavelength band. For the maximum range of angles of incidence, viz. 180°, the total reflection band should be 360 nm+180×2 nm=740 nm. Since the width of the reflection band averages 50 nm for a known cholesteric layer in the visible wavelength range, a conventional, stacked filter should have approximately 15 layers.

A cholesteric filter consisting of one single layer in which the pitch p varies continuously across the layer thickness can be made as follows. Firstly, a mixture of reactive monomers is made. This mixture comprises different percentages by weight of a chiral component and a nematogeneous component, which components have a different number of reactive groups, for example two and one, respectively, so that the two monomers will have a different reactivity. A stabilizer and a quantity of dye are subsequently added to this mixture. The mixture thus made is then provided between two transparent substrates, each of which may have, for example, a layer of polyimide. These layers are used for aligning the molecular helix which is produced spontaneously in the cholesteric mixture. To prevent the formation of disclinations, the two substrates are sheared over a small distance until a planar ordering is created. Subsequently the reactive mixture is photopolymerized at ambient temperature by means of UV radiation so that a three-dimensional network is formed. Due to the strength of the optically active layer thus formed it is possible to detach the optical layer from the substrates and use this layer as a self-supporting cholesteric filter. The desired reflection bandwidth, for example a reflection bandwidth corresponding to the full visible wavelength range, can be achieved by varying the quantity of dye, the wavelength and the power of the UV light.

Figure 2:
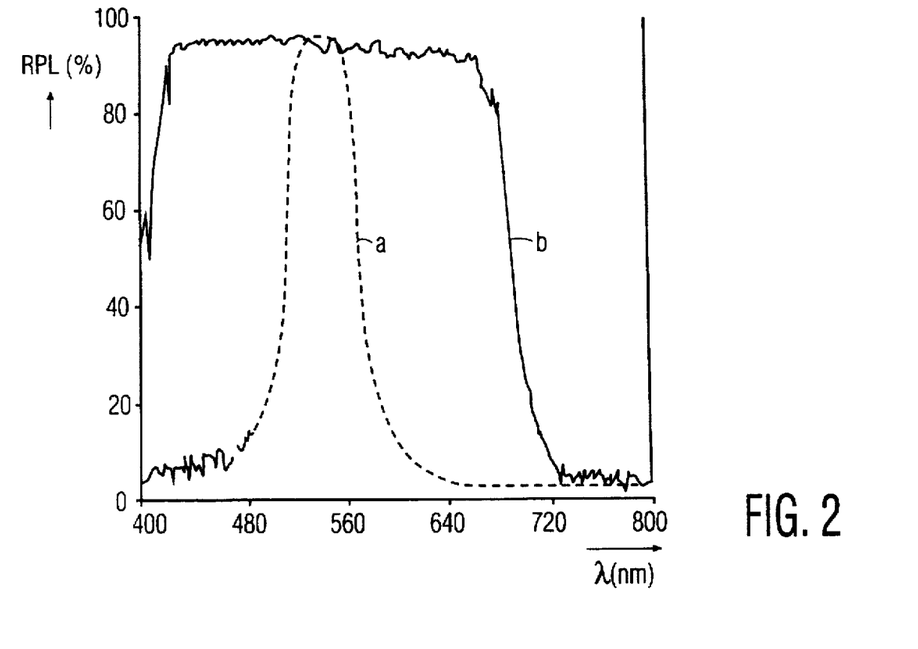
FIG. 2 shows the reflection spectra of a cholesteric filter (a) in which the pitch p is constant across the layer thickness and (b) in which the pitch p varies continuously across the layer thickness.

Curve a in FIG. 2 represents the reflection spectrum of a cholesteric filter in which the pitch p is constant across the layer thickness. This filter was obtained without addition of a dye. The reflection bandwidth of the filter is only approximately 45 nm.

Curve b in FIG. 2 represents the reflection spectrum of a cholesteric filter in which a dye was present during polymerization. The reflection bandwidth of the filter is approximately 230 nm.

For further details relating to the manufacture of a single-layer cholesteric filter with a pitch p continuously varying across the layer thickness, reference is made to the application Ser. No. 08/179,420, filed Jan. 10, 1994 and whose contents are herein incorporated by reference.

An embodiment in which the optical quality of the filter is considerably better and the viewing angle dependence is less pronounced than in a cholesteric filter composed of a plurality of narrow-band cholesteric layers is a cholesteric filter which is made from a plurality of layers, at least a number of which have a pitch p of the molecular helix which varies continuously across the layer thickness.

The layers within which the pitch p varies across the layer thickness may be manufactured in an equivalent manner as described above for a single-layer filter.

If, as proposed by the invention, the bandwidth of a cholesteric layer is increased to, for example 150 nm, the number of required layers for the visible wavelength range can be reduced from 15 to 5.

Due to the above-described properties of a cholesteric filter, the radiation which is circularly polarized in the direction corresponding to the direction of the molecular helix is reflected in the direction of the radiation source 13, whereas the oppositely circularly polarized radiation is transmitted by the filter 19. The reflected radiation subsequently reaches the diffuser 17 again, at which the radiation is depolarized. The depolarized radiation is then incident on the reflector 15 on which reflection takes place in the direction of the filter 19. A part of the unpolarized radiation which has reached the filter again will have a circular state of polarization which is suitable for transmission. The remaining part again traverses the radiation path described, while each time a part of the radiation is transmitted. Apart from reflection losses, substantially all unpolarized radiation is converted in this way into circularly polarized radiation suitable for the display panel.

Figure 3A:
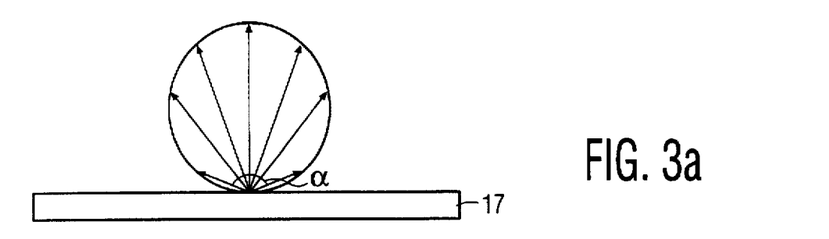
FIGS. 3a and 3b show the scattering of a radiation beam without and with a prism foil.

The light from the radiation source 13 is scattered by the diffuser 17 over an angular area of substantially 180°, as is shown in FIG. 3a. Since the effectiveness of a cholesteric filter is not only determined by the wavelength of the incident radiation but also by the angle of incidence of this radiation, such a diffuser also scatters radiation towards the filter at large angles of incidence. As a result, the reflection band of the filter required for covering a given wavelength range will have to be increased by a fictitious wavelength band so as to be effective for large angles of incidence as well. The shift of the reflection band as a function of the angle of incidence is, for example 2 nm per degree. Consequently, for an angular area of 180°, the reflection band is to be increased by 180×2 nm=360 nm.

Figure 4:
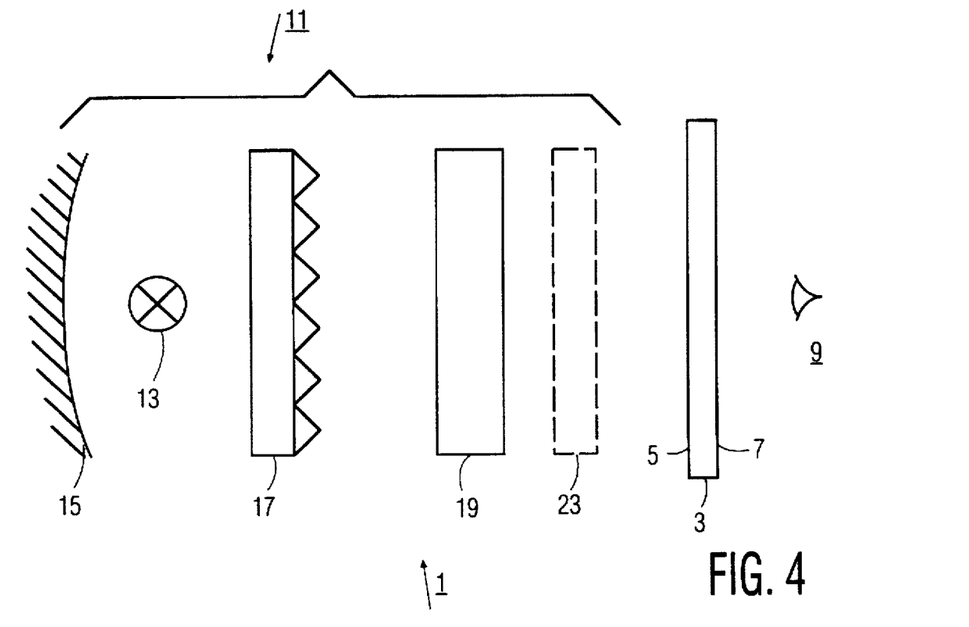
FIG. 4 shows diagrammatically an embodiment of a display device with a prism foil.

By providing a beam-concentrating element 21 between the diffuser 17 and the cholesteric filter 19, as is shown in FIG. 4, the area of the angles of incidence can be considerably reduced, which results in a reduction of the total required reflection band of the cholesteric filter.

This is illustrated with reference to a numerical example. By using, for example a diffuser in the form of a prism foil for which the area of the angles of incidence is reduced to 90°, the number of conventional layers with a reflection bandwidth of 50 nm required to cover the full visible wavelength range is given by [780 nm–400 nm+(2×90)]/50=1~11 layers instead of an ~15 layers without a prism foil.

For a filter with cholesteric layers in which the pitch varies continuously and consequently has a reflection band of 150 nm, it is sufficient to use [780 nm–400 nm+(2×90)]/150=~4 layers instead of ~5 layers. For a filter with a varying pitch the values of the lower limit and the upper limit of the pitch p will be closer together.

The beam-concentrating element 21 is made of an optically transparent material and may be provided, for example directly on the diffuser 17, as is shown in FIG. 4. The surface of the element 21 facing the filter 19 has a periodical and radiation-refracting structure, for example a prism structure.

Figure 3B:
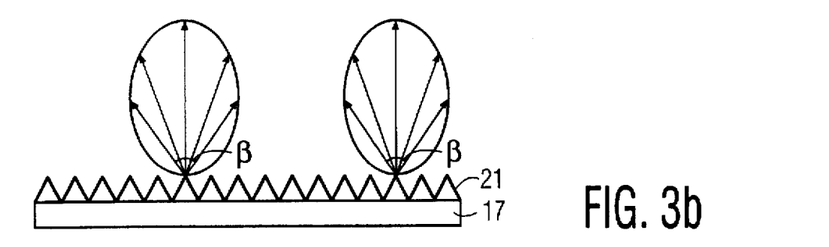

FIG. 3b shows the effect of an element 21 having such a structure, for example a one-dimensional prism structure, hereinafter referred to as prism foil, on the radiation from the diffuser 17. A comparison of this Figure with FIG. 3a shows that the radiation is concentrated to a beam within an angle β which is smaller than the angle α. Consequently, the brightness of the diffuser increases in the forward direction. This angular area β can be varied by varying the angles of inclination of the prism edges.

Figure 5A:
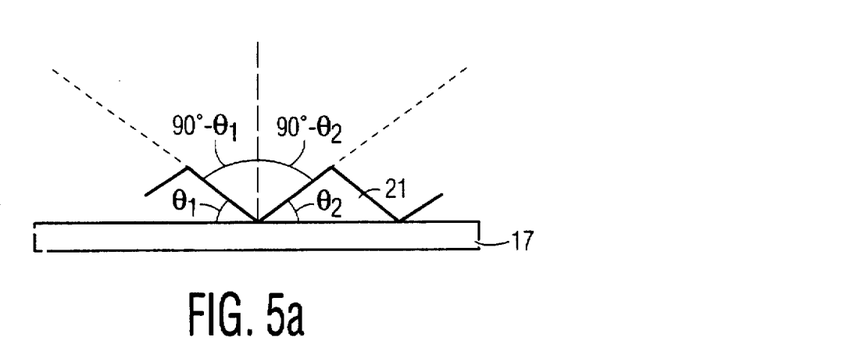
FIGS. 5a and 5b show the scattering mechanism of a prism foil.
Figure 5B:
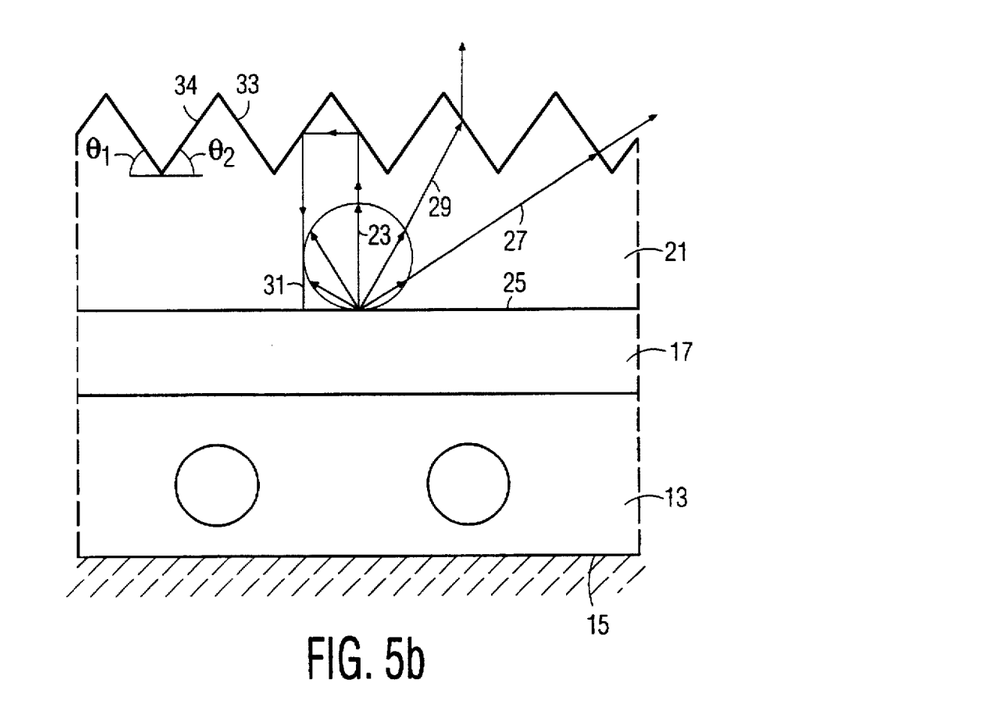

FIGS. 5a and 5b illustrate the operation of a prism foil with reference to an embodiment having a structure extending in one direction. A radiation beam 23 which is perpendicularly incident on the interface 25 between the diffuser 17 and the prism foil 21 undergoes total internal reflection at the edges 33 and 34 of the prism foil 21 because the angle of incidence is larger than the critica/angle. On the other hand, radiation beams 27, 29 which are incident on the edges 33 and 34 at an angle which is smaller than the critical angle can leave the prism foil 21 through the edges 33 and 34. Thus, the prism foil 21 ensures that the radiation can only exit at an angle in the range between 90°-θ$_1$ and 90°-θ$_2$, i.e. the angles enclosed by the prism edges with the normal on the foil. By adapting the angles θ$_1$ and θ$_2$, i.e. the angles enclosed by the edges 33, 34 of the foil structure with the face of the diffuser 17, it is possible to fix the direction of the radiation beam. The radiation beam 31 reflected by the prism foil 21 returns via the diffuser 17 to the reflector 15 behind the radiation source 13 and, after reflection, is again supplied to the system.

Figure 6A:
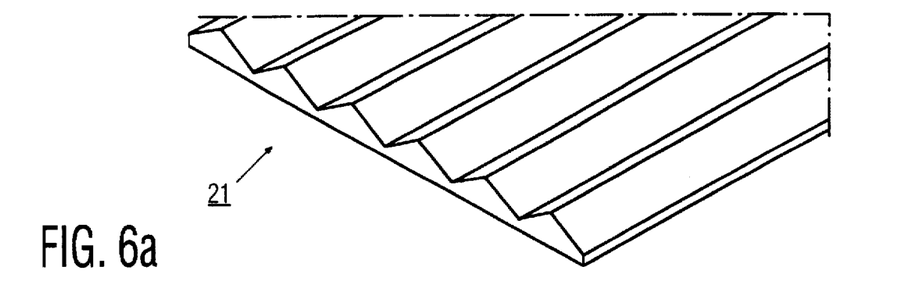
FIGS. 6a, 6b, 6c and 6d show some embodiments of a prism foil for use in a display device according to the invention.
Figure 6B:
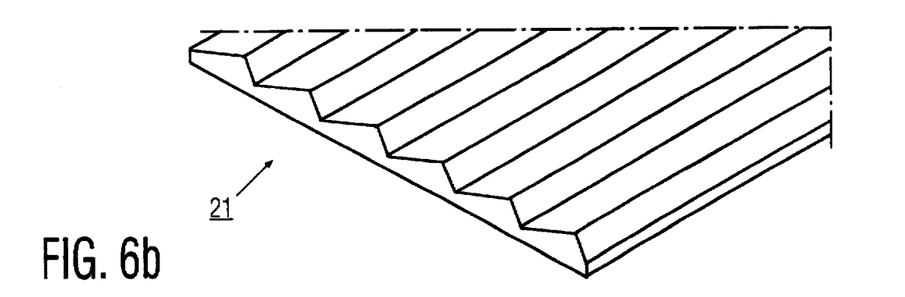
Figure 6C:
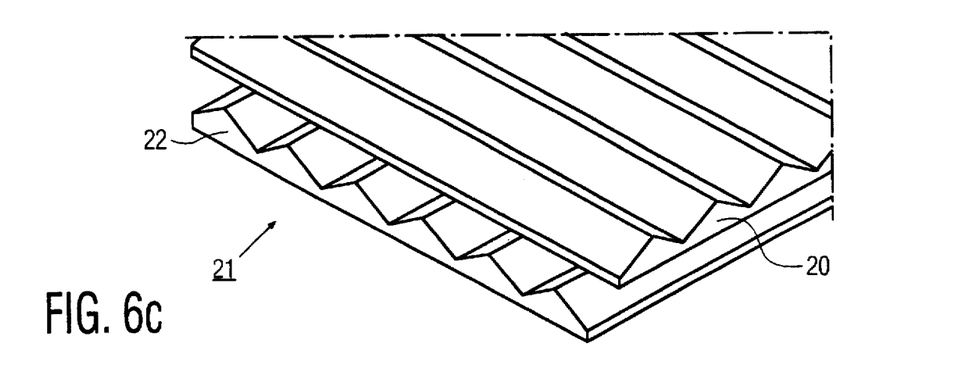
Figure 6D:
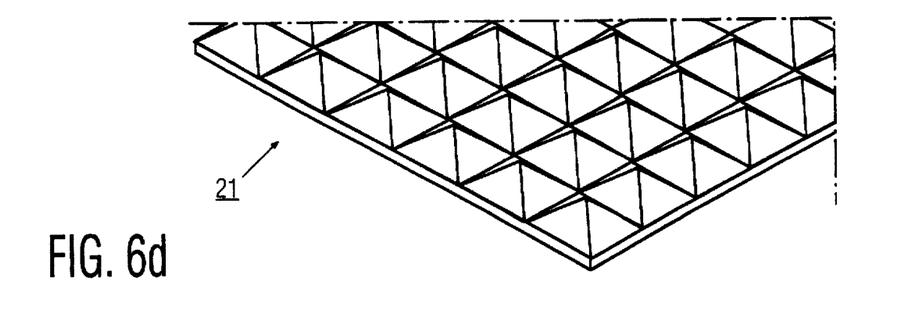

FIGS. 6a, 6b, 6c and 6d show a number of different embodiments of prism foils. FIG. 6a shows a prism foil comprising a single plate whose surface facing the filter has a symmetrical triangular structure, in which $\theta_1=\theta_2$. FIG. 6b shows a prism foil also comprising a single plate having a sawtooth-shaped structure on the surface facing the filter, in which $\theta_1 \approx \theta_2$. In this manner the radiation is not only concentrated to a beam at a given angle, but the axis of the beam exiting from the prism foil can be adjusted by varying $\theta_1$ and $\theta_2$. FIG. 6c shows a prism foil operating two-dimensionally. Here, the radiation is concentrated to a beam in two dimensions. This prism foil comprises two plates 20, 22 each provided with a beam-concentrating element. The first plate 20 on the surface facing the filter has a first periodical structure which extends in a first direction, for example a regular triangular structure as is shown in FIG. 6a, the second plate 22 on the surface facing the filter has a second periodical structure, for example also a structure as shown in FIG. 6a. The two structures are oriented at a given angle with respect to each other, for example at right angles. A combination of two structures as shown in FIG. 6b or a combination of a structure as shown in FIG. 6a and a structure as shown in FIG. 6b is possible, dependent on the envisaged concentration of radiation. A two-dimensionally operating beam-concentrating element may alternatively comprise a plate with a matrix of lenses or pyramid-shaped prisms. An embodiment of such a prism foil with a matrix of prisms on the prism foil surface facing the filter is shown in FIG. 6d.

The Moiré effects which may occur in a single or composite prism foil in combination with an LCD panel may be reduced by adapting the period of the structure of the foil to the period of the pixels in the display panel A λ/4 plate 23 may optionally be arranged behind the cholesteric filter 19 in the device of FIG. 1 as well as that of FIG. 3 so that circularly polarized radiation is converted into linearly polarized radiation. Most currently used liquid crystalline display panels operate with linearly polarized radiation. Since the use of a λ/4 plate is dependent on the nature of the display panel 3, the plate 23 is shown in a broken line in the two Figures. Since the circular-to-linear conversion is to be realised in the visible wavelength range, a wideband λ/4 plate as described, for example in U.S. Pat. No. 5,029,986 is used.

If the cholesteric filter is a single-layer filter with an optically active layer forming a three-dimensional network and, due to its special robustness, constitutes a self-supporting film, this filter can be secured to other elements such as to the diffuser 17 or to the possible λ/4 plate 23. A very compact illumination system is obtained in this way.

The way in which very efficient use of the available radiation of the source can be made in an illumination system has been described hereinbefore, both as regards the direction of polarization and the direction of propagation of the radiation, as well as the advantages of such a system in a display device. If this device is a directvision color display device, the radiation efficiency can be further enhanced by a novel combination of the invention described above with the invention described in U.S. Pat. No. US-A 5,029,986. The luminous efficiency can then also be increased as far as the color is concerned.

Figure 7:
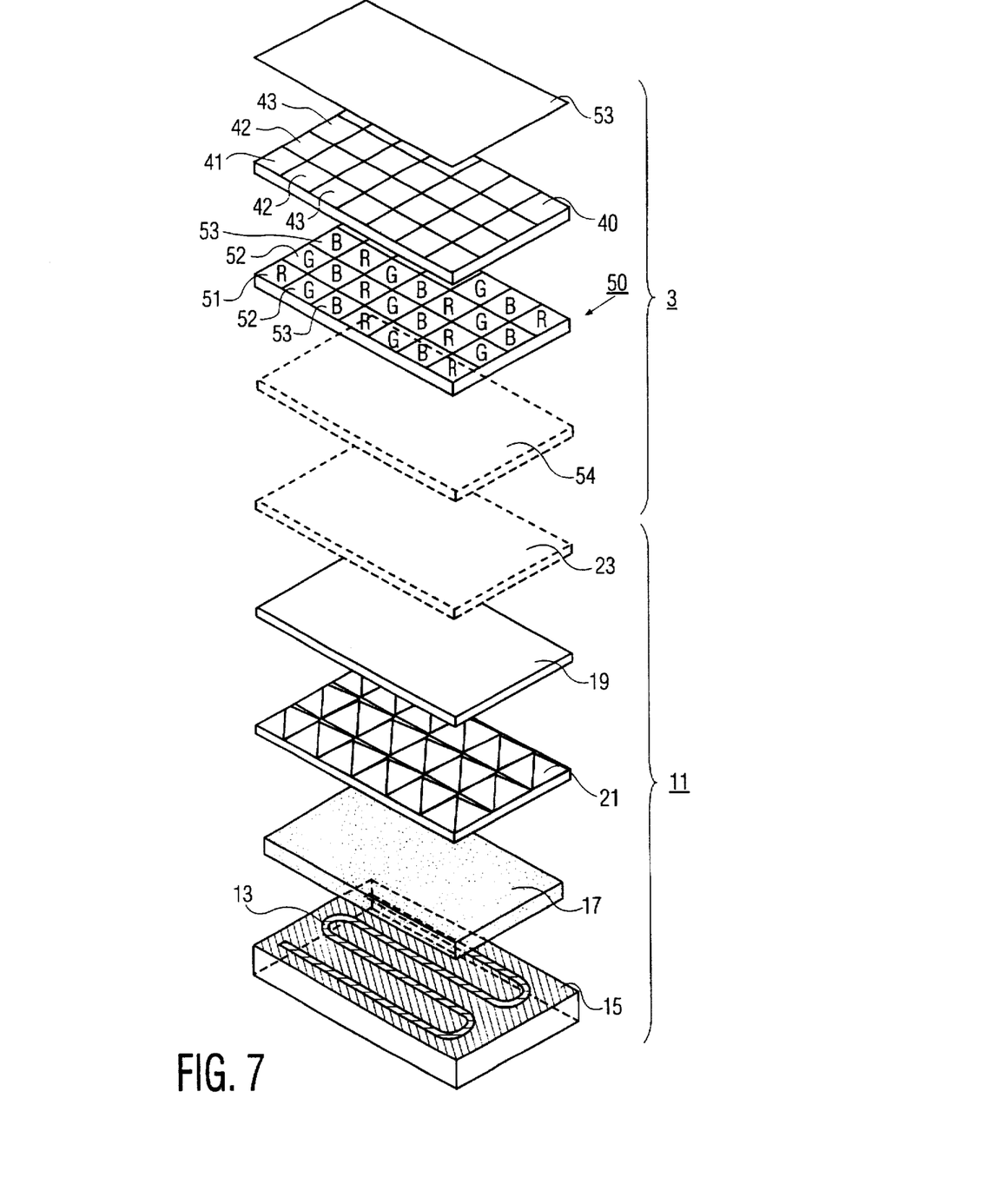
FIG. 7 shows an embodiment of a flat-panel color display device including an illumination system according to the invention.

FIG. 7 shows diagrammatically a display device in which the novel combination is used. The illumination system 11 again comprises a radiation source 13, a diffuser 17, a cholesteric polarization filter 19 and, optionally, a beam-concentrating element 21. The radiation source is, for example a meander-shaped lamp which is arranged in a holder having reflecting inner walls 15. The color display panel 40 comprises a large number of pixels divided into three groups denoted by the reference numerals 41, 42 and 43 each generating a picture of a given color, viz. red, green and blue, respectively. A matrix 50 of color falters registering with the pixels is arranged in front of the panel 40, which color filters are also divided into three groups denoted by the reference numerals 51, 52 and 53. These color filters which only transmit light of the suitable color to the associated pixels 41, 42, 43 are dichroic mirrors in this embodiment. Such a mirror reflects the color components not associated with the pixel of the incident sub-beam towards the radiation source. The reflecting inner walls of the holder send the sub-beam back into the system again. When this sub-beam has arrived at the matrix 50, it impinges upon a mirror other than that by which it was initially reflected because, on its path, the direction of this sub-beam has changed. A second color component of this sub-beam is then as yet transmitted to an associated pixel. The remaining color component of the sub-beam again traverses the path to and from the radiation source holder and can then be passed by a further color filter to an associated pixel. Since all sub-beams traverse the system several times in the manner described above, it is achieved that the greater part of the source radiation is incident on the pixels in the correct color so that a high efficiency is also achieved as far as the color is concerned.

FIG. 7 shows the λ/4 plate 23 in a broken line again because its provision depends on whether the LCD panel operates with linearly polarized or with circularly polarized radiation.

If the selectivity of the cholesteric filter 19 for levorotatory and dextrorotatory circularly polarized radiation is large enough, it is possible to dispense with a conventional polarizer 54 which is arranged in front of the LCD panel 3 and forms part of a conventional LCD panel and which, together with the analyzer 53 behind the LCD panel 3 ensures a sufficient contrast of the picture formed.

Figure 8:
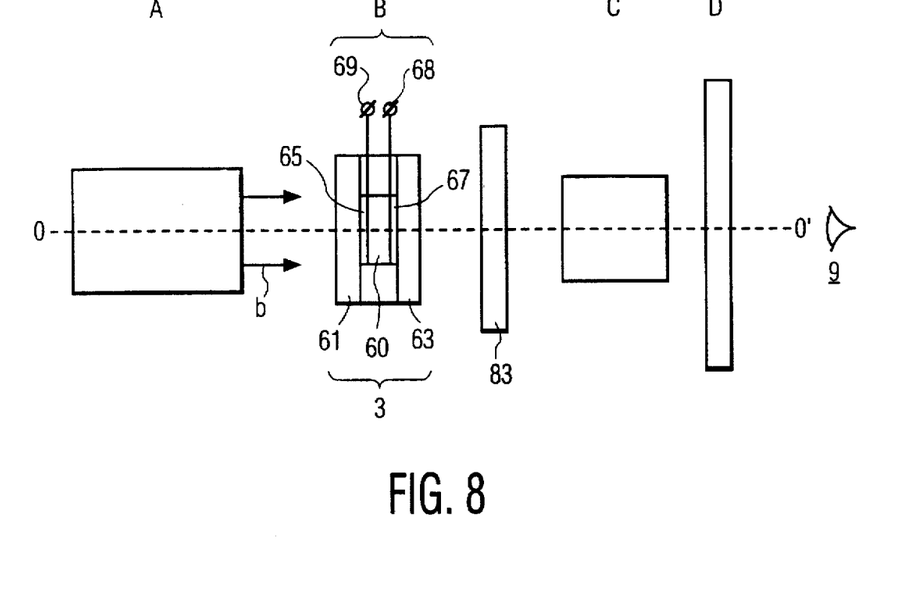
FIG. 8 shows an embodiment of an image projection device including an illumination system according to the invention.

FIG. 8 shows an embodiment of an image projection device. In this Figure the block A represents an illumination system according to the invention, which emits a light beam b whose principal axis coincides with the optical axis OO' of the image projection device. This beam is incident on a display system B which has one display panel 3 if a monochromatic image is to be projected. This panel is, for example a liquid crystal panel having a layer of liquid crystalline material 60, for example of the nematic type, enclosed between two transparent, for example glass, plates 61 and 63. Drive electrodes 65 and 67, respectively, are provided on each plate. These electrodes may be divided into a large number of rows and columns so that a large number of pixels in the display panel is defined. The different pixels are then driven by driving the matrix electrodes as is shown diagrammatically by means of the drive terminals 69 and 68. An electric field can thus be applied across the liquid crystalline material 60 at the desired positions. Such an electric field causes a change of the effective refractive index of the material 60 so that the right passing through a given pixel undergoes or does not undergo a change of the state of polarization, dependent on the absence or presence of a local electric field at the location of the relevant pixel.

Instead of using this passive-drive display panel, it is alternatively possible to use an active-drive panel. In the latter panel one of the supporting plates has an electrode, while the other plate is provided with the semiconductor drive electronics. Each pixel is now driven by its own active drive element such as, for example a thin-film transistor. Both types of direct-drive display panels are described in, for example European Patent Application EP 0 266 184.

The beam incident on the display panel 3 should be polarized, preferably linearly polarized. To this end the illumination system is provided with a polarizer in the form of a single layer or multilayer cholesteric filter and with a diffuser as described hereinbefore. An analyzer 83 is further arranged in the path of the right transmitted by the display panel, which analyzer passes, for example the light from those pixels which are energized and do not change the state of polarization of the beam towards a projection lens system C. The light from the non-energized pixels which change the state of polarization of the beam is obstructed by the analyzer 83. The analyzer thus converts the polarization modulation of the beam into an intensity modulation. The projection lens system C projects the image formed on the panel 3 on a projection screen D. This projected image can be observed by a viewer 9 in the space behind the projection screen.

As already noted, the display panel is preferably irradiated with linearly polarized right, while the panel elements rotate or do not rotate the direction of polarization through 90°. In principle, it is also possible to operate an image projection device having liquid crystal display panels with circularly or elliptically polarized light instead of with linearly polarized light. The display panel can then change the direction of rotation of the circularly polarized light or the ratio of the elliptical axes of the elliptically polarized light. Said changes can be converted into an intensity modulation by using extra polarization means.

If the image projection device is a color image projection device, the display system B comprises three display panels, one for each of the primary colors red, green and blue, as well as a number of dichroic mirrors which split the beam b into a red, a green and a blue beam each being incident on an associated panel. A further set of dichroic mirrors combines the beams passing through these panels to one beam which traverses the projection lens system.

It is alternatively possible to use one color display panel in a color image projection device. A matrix of dichroic mirrors arranged in front of the pixels as described with reference to FIG. 7 is then preferably used again, so that the advantages described with reference to this Figure can also be achieved in a color image projection device.

Although the invention has been described with reference to a display device comprising a liquid crystalline display panel which may be of the twisted nematic type or of the supertwisted type, it is not limited thereto. The panel may alternatively be an SCD (Solid Ceramic Display) panel in which the polycrystalline material PZLT (Lanthanum doped Lead Zirconate Titanate) is used, or a panel in which the superbirefringent effect is used.

We claim:

1. An illumination system for supplying an illumination beam having a selected state of polarization, which system successively comprises a reflector, a radiation source and a cholesteric filter, the filter active within the visible wavelength range, and a depolarizer arranged between the radiation source and the cholesteric filter.

2. The illumination system of claim 1 in which the cholesteric filter comprises a plurality of layers of liquid crystalline material, each layer being active for a different wavelength band, which wavelength bands jointly cover at least substantially the visible wavelength range.

3. The illumination system of claim 1 in which the cholesteric filter comprises at least one layer of liquid crystalline polymer material comprising molecules in the form of a helix, within said layer the pitch of the helix varies between first and second values which correspond to the lower limit and the upper limit, respectively, of a reflection band necessary to cover at least substantially the visible wavelength range.

4. The illumination system of claim 3 in which the cholesteric filter comprises a plurality of layers, each layer comprising a liquid crystalline polymer material having molecules in the form of a helix, within said layer the pitch of the helix varies between first and second values which correspond to the lower limit and the upper limit, respectively, of a different wavelength band, said wavelength bands jointly cover at least substantially the visible wavelength range.

5. The illumination system of claim 3 in which the pitch varies continuously from the first value to the second value across the thickness of the layer.

6. The illumination system of claim 3 in which the polymer material of the cholesteric filter forms a self-supporting film of a three dimensional network.

7. The illumination system of claim 1 in which the cholesteric filter consists of a single layer, the layer comprising a liquid crystalline polymer material having molecules in the form of a helix, within said layer the pitch of the helix varies between first and second values which correspond to the lower limit and the upper limit, respectively, of a different wavelength band, said wavelength bands jointly cover at least substantially the visible wavelength range.

8. The illumination system of claim 2 or 3 in which an optically transparent element is arranged between the depolarizer and the cholesteric filter, the side of the element facing the filter having a periodical and radiation refracting structure extending in at least one direction for concentrating radiation from the depolarizer at a given angle.

9. An illumination system as claimed in claim 8, characterized in that the element is composed of a first plate of which a surface facing the filter has a first periodical structure which extends in a first direction in the plane of the plate, and a second plate of which a surface facing the filter has a second periodical structure which extends in a second direction in the plane of the plate and at an angle to the first direction.

10. An illumination system as claimed in claim 8, characterized in that the element is a single plate of which a surface facing the filter has a two-dimensional radiation-refracting structure.

11. An illumination system as claimed in claim 8, characterized in that the radiation-refracting structure is constituted by first surface areas which cover second surface areas, the first areas enclosing a first angle and the second areas enclosing a second angle with the normal on the element.

12. A display device incorporating the illumination system of claim 1 or 3.

13. The display device of claim 12 in which the cholesteric filter is active in at least substantially the visible wavelength range.

14. The display device of claim 12 having at least one transmission display panel, arranged at a side of the cholesteric filter remote from the depolarizer, for generating an image to be displayed.

15. The display device of claim 14 in which the transmission display panel is an LCD panel.

16. The display device of claim 15 in which a wideband $\lambda/4$ plate is arranged between the cholesteric filter and the LCD panel.

17. The display device of claim 15 in which a beam concentrating element is present between the depolarizer and the cholesteric filter.

18. The display device of claim 14 having at least one projection lens system for projecting the generated image on a projection screen.

19. The display device of claim 14 in which the transmission display panel is a color display panel having a matrix of pixels.

20. The display device of claim 19 in which a matrix of dichroic mirrors is arranged proximate to and in register with the matrix of pixels.

* * * * *